United States Patent
Singh et al.

(10) Patent No.: US 9,628,329 B2
(45) Date of Patent: Apr. 18, 2017

(54) UBIQUITOUS COLLABORATION IN MANAGED APPLICATIONS

(71) Applicant: Citrix Systems, Inc., Fort Lauderdale, FL (US)

(72) Inventors: Jaspreet Singh, Fort Lauderdale, FL (US); Maria Isabel Gomez, Hallandale Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 277 days.

(21) Appl. No.: 14/221,958

(22) Filed: Mar. 21, 2014

(65) Prior Publication Data

US 2015/0271013 A1    Sep. 24, 2015

(51) Int. Cl.
| | |
|---|---|
| H04L 12/24 | (2006.01) |
| H04L 12/18 | (2006.01) |
| H04L 29/08 | (2006.01) |
| G06F 9/54 | (2006.01) |

(52) U.S. Cl.
CPC ......... *H04L 41/0806* (2013.01); *G06F 9/541* (2013.01); *H04L 12/1813* (2013.01); *H04L 67/10* (2013.01)

(58) Field of Classification Search
CPC ..... H04L 67/10; H04L 41/0806; H04L 63/20; G06F 9/542; G06F 9/4445; G06F 2209/544; G06F 21/53; G06F 9/541; H04W 12/12
See application file for complete search history.

(56) References Cited

U.S. PATENT DOCUMENTS

| | | | | |
|---|---|---|---|---|
| 8,892,630 B1 * | 11/2014 | Curtis | ............... | G06Q 30/0282 709/203 |
| 2002/0149618 A1 * | 10/2002 | Estrada | ................. | G06Q 10/10 715/760 |
| 2007/0050448 A1 * | 3/2007 | Gonen | ................... | H04N 7/152 709/204 |
| 2007/0162578 A1 * | 7/2007 | Bhaskaran | ............. | G06Q 10/10 709/223 |
| 2007/0244980 A1 | 10/2007 | Baker et al. | | |
| 2009/0089379 A1 | 4/2009 | Pegg | | |
| 2010/0037153 A1 * | 2/2010 | Rogers | .................. | G06F 3/0481 715/758 |
| 2010/0312836 A1 * | 12/2010 | Serr | ....................... | G06Q 10/00 709/206 |
| 2011/0137974 A1 * | 6/2011 | Momchilov | .............. | G06F 9/54 709/202 |

(Continued)

FOREIGN PATENT DOCUMENTS

EP    2116935 A1    11/2009

OTHER PUBLICATIONS

Dec. 2, 2014—(PCT) International Search Report—App. PCT/US104/031717.

*Primary Examiner* — Ario Etienne
*Assistant Examiner* — Kidest Mendaye
(74) *Attorney, Agent, or Firm* — Banner & Witcoff, Ltd.

(57) ABSTRACT

Methods and systems for an ubiquitous collaboration feature in a managed application environment are described herein. The collaboration service and/or server may store session information and one or more configuration files for use in rendering the collaboration features in combination with managed applications executing on a user's computing device.

20 Claims, 15 Drawing Sheets

(56) References Cited

U.S. PATENT DOCUMENTS

| | | | |
|---|---|---|---|
| 2012/0005596 A1* | 1/2012 | Carlson | G06F 9/445 715/751 |
| 2012/0158849 A1* | 6/2012 | Yoakum | H04L 12/1822 709/205 |
| 2012/0210253 A1* | 8/2012 | Luna | G06Q 10/107 715/753 |
| 2013/0091543 A1 | 4/2013 | Wade et al. | |
| 2013/0227641 A1* | 8/2013 | White | H04L 63/20 726/1 |
| 2014/0006505 A1* | 1/2014 | Rama Rao | H04L 51/32 709/204 |
| 2015/0081832 A1* | 3/2015 | Handa | G06F 15/167 709/213 |

\* cited by examiner

UBIQUITOUS COLLABORATION IN MANAGED APPLICATIONS

FIELD

Aspects described herein generally relate to collaboration features, such as text chat, video chat, audio chat, presence, and/or others, in a managed application environment.

BACKGROUND

Some applications, such as mobile applications, may be managed applications. Managed applications may utilize policies to regulate execution of applications in a shared environment. Execution sandboxes and other techniques in the mobile phone environment are alternative examples of managed applications. While programmers of a managed application can re-write the native source code of their applications to add collaboration features after-the-fact, it is a cumbersome process that can be both time-consuming and costly. In addition, each application may have its own text chat feature that might not be compatible with another application's chat feature. Thus, users may be forced to switch back-and-forth between chat applications as they switch among using different applications. There remain numerous drawbacks and limitations in the prior art as it relates to collaboration in a virtualized environment.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards a method of providing one or more collaboration features in combination with a managed application rendered (e.g., displayed) on a client computing device. In one example, the method includes, inter alia, automatically rendering one or more collaboration features (e.g., a collaboration component/module) in combination with a rendering of a first managed application, and communicating session information about the collaboration feature. The first managed application may have features added or removed at runtime or beforehand by wrapping, i.e., wrapped, with one or more managed features, including, but not limited to a collaboration feature.

In addition, the aforementioned method may further include a second managed application (or even more managed applications) that is also wrapped to provide a collaboration feature during managed mode. The collaboration feature among the managed applications may share session information such that the collaboration feature may execute across the first managed application and the second managed application.

In various examples, the collaboration feature may be incorporated into the managed application environment by way of a software development toolkit that wraps a native application and adds (or injects) one or more managed application features such as containment, encryption, etc. to the managed application. As such, when the collaboration feature is enabled in a managed mode of the application, then the managed collaboration feature becomes operative. In another example, the collaboration feature may be incorporated into the managed application environment by way of an application programmer's interface (API) that allows a managed application to interact with collaboration features. In yet another example, the collaboration feature may be a standalone collaboration software that interacts with the managed application through one or more predefined hooks (e.g., a dynamic linked library (e.g., .dll, .dylib, .jar, etc.) file). Where appropriate, "collaboration feature" should be broadly interpreted to include each of the aforementioned examples.

In addition, in another example, the client agent (via the managed application) may interface with the collaboration feature/service to facilitate the rendering/displaying of the collaboration feature and/or other aspects. The system may detect whether stored rules/policies have been satisfied before activating or deactivating the rendering of the collaboration feature in combination with the subject managed application.

Furthermore, a collaboration server may interact with the other components to send session information and one or more configuration files associated with managed applications. As a result, causing a collaboration service executing on a client computing device to render a collaboration feature in accordance with style or other information in its respective configuration file.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards methods and systems for an ubiquitous collaboration feature in a managed application environment. A collaboration service and/or collaboration server may store session information and one or more configuration files for use in rendering the collaboration features in combination with managed applications executing on a user's computing device. The managed application may operate in various modes. The managed application may have one or more contexts/factors that are determined. Based on the context, the managed application may be run on the client computing device in one of a plurality of operations modes, such as, but not limited to managed, unmanaged, and partially managed modes. Depending on the mode, one or more collaboration features may be rendered/made accessible through the managed application's user interface.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture.

Figure 1:
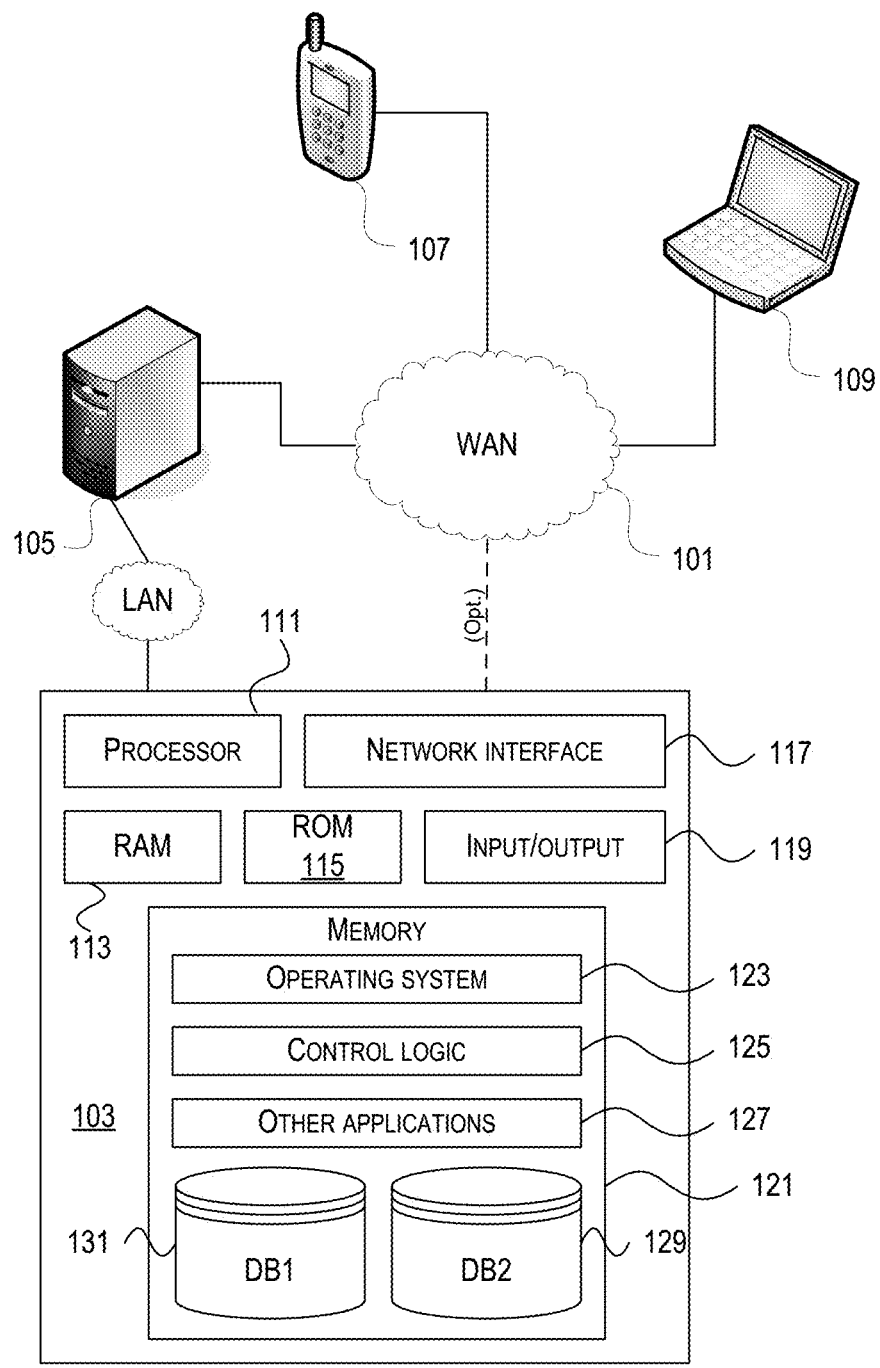
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. In some examples, the web server 105 and/or data server 103 may be referred to as a resource server (or content resource server) because they provide content in response to an appropriately formatted request (e.g., a HTTP request). Client computers 107, 109 may be used in concert with data server 103 to access data stored therein, or may be used for other purposes. For example, from client device 107 a user may access resource/web server 105 using an Internet browser, as is known in the art, or by executing a software application that communicates with a resource server (e.g., web server 105 and/or data server 103) over a computer network (such as the Internet).

Servers and applications may be combined on the same physical machines, and retain separate virtual or logical addresses, or may reside on separate physical machines. FIG. 1 illustrates just one example of a network architecture that may be used, and the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. The functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
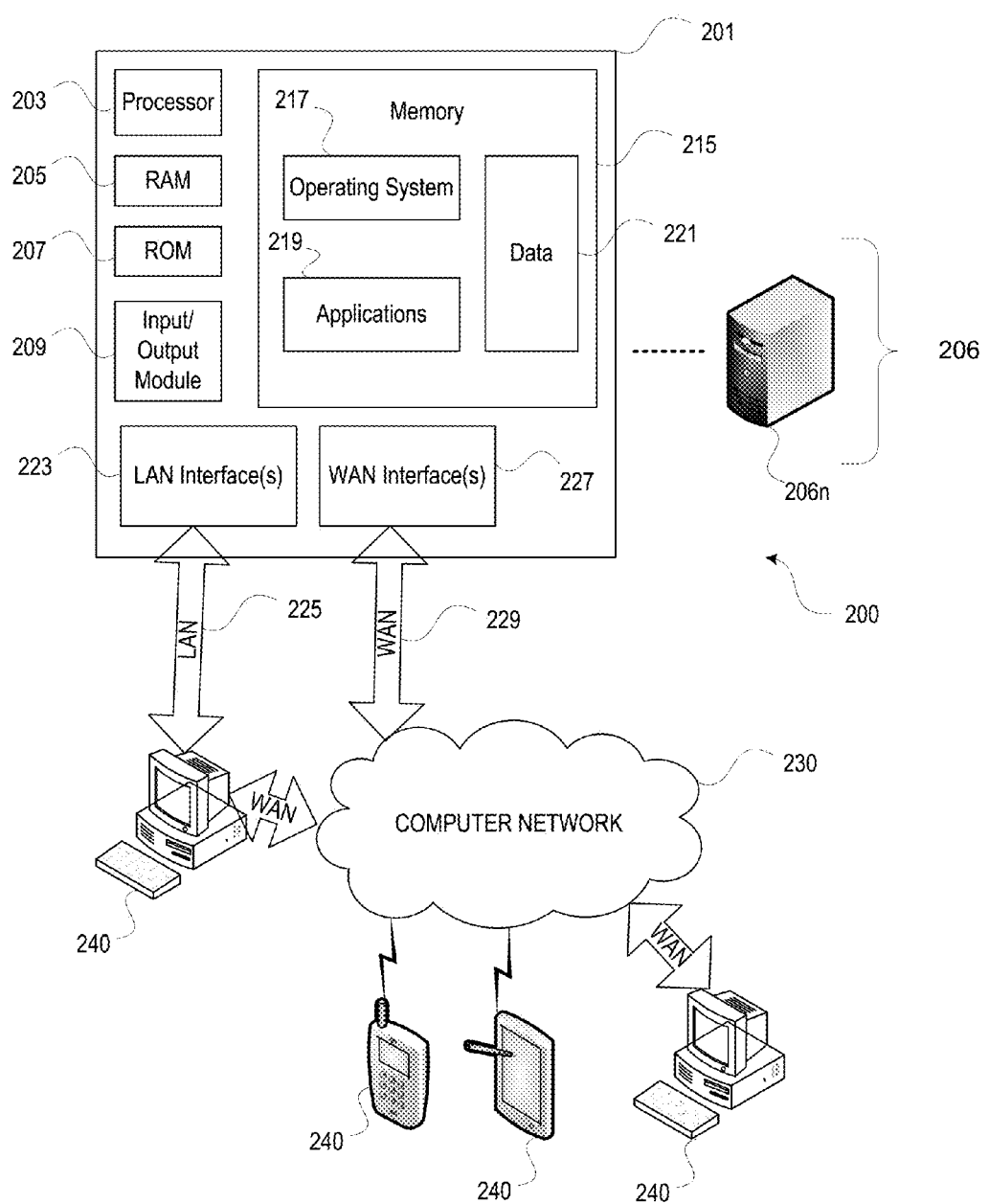
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. Alternatively, generic computing device 201 may, in some examples, be referred to as a user computing device (e.g., computing device 201, terminals 240, mobile terminals/devices, mobile phones, smartphones, PDAs, tablets, notebooks/laptops, personal computers, and others). The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
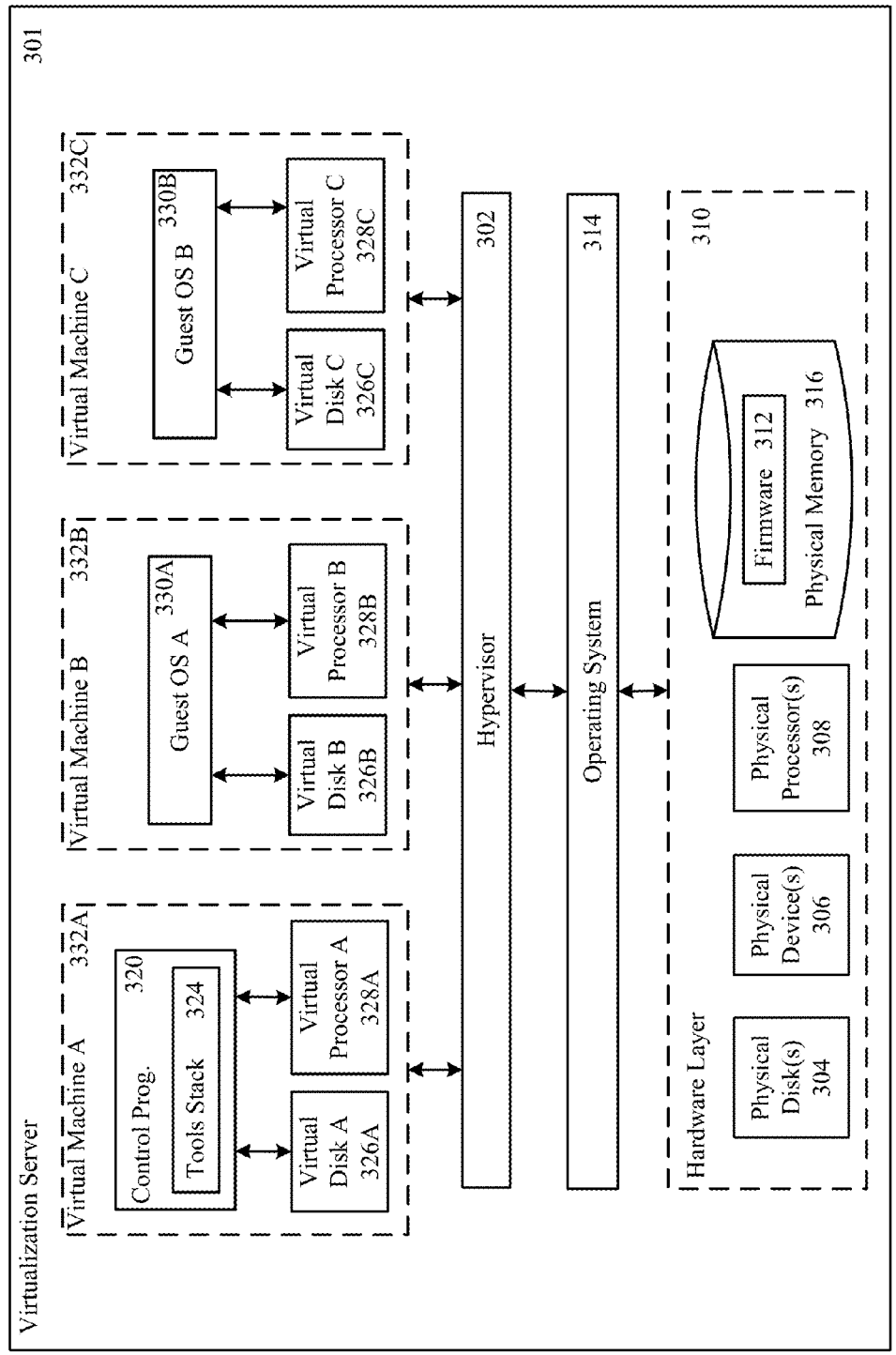
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
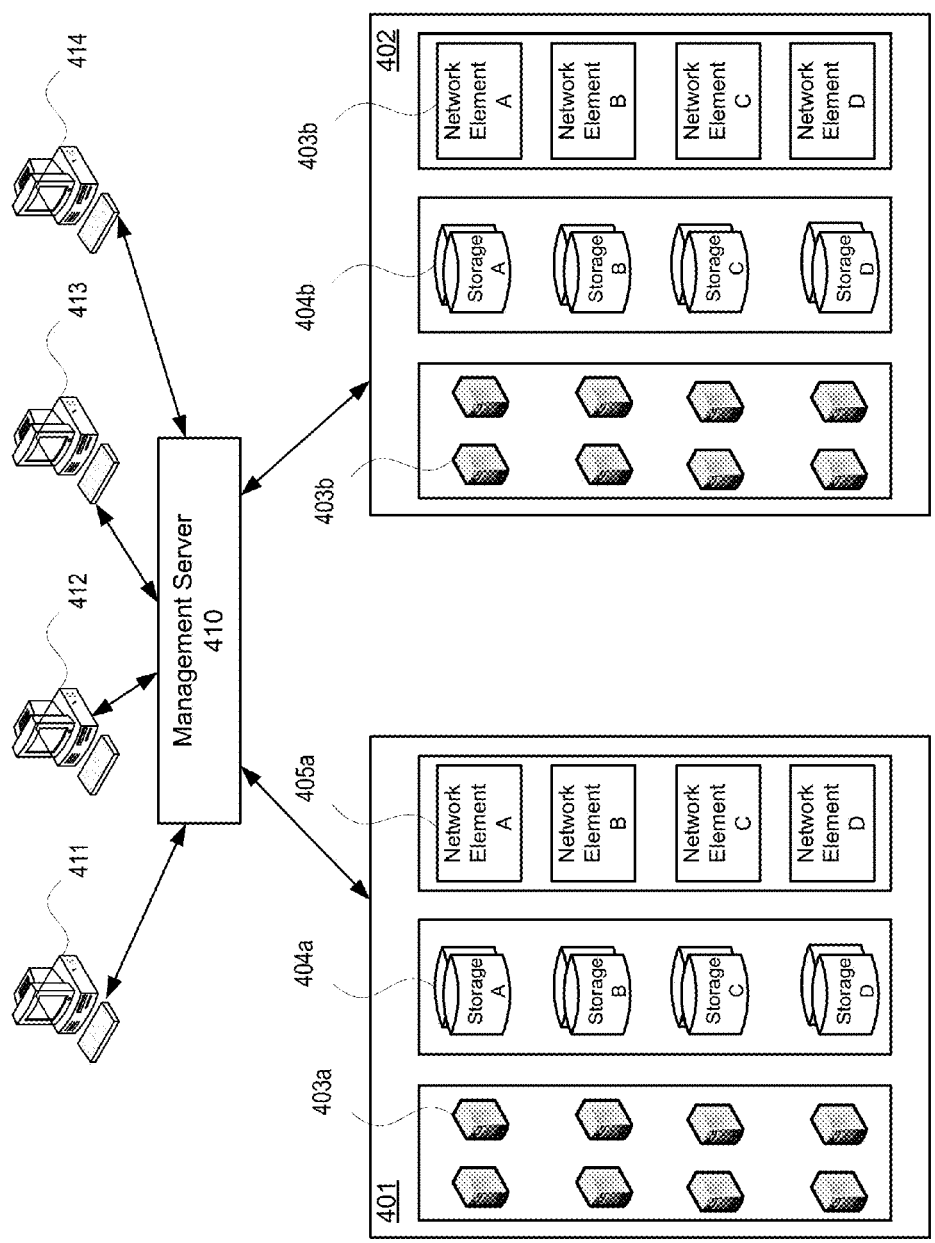
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
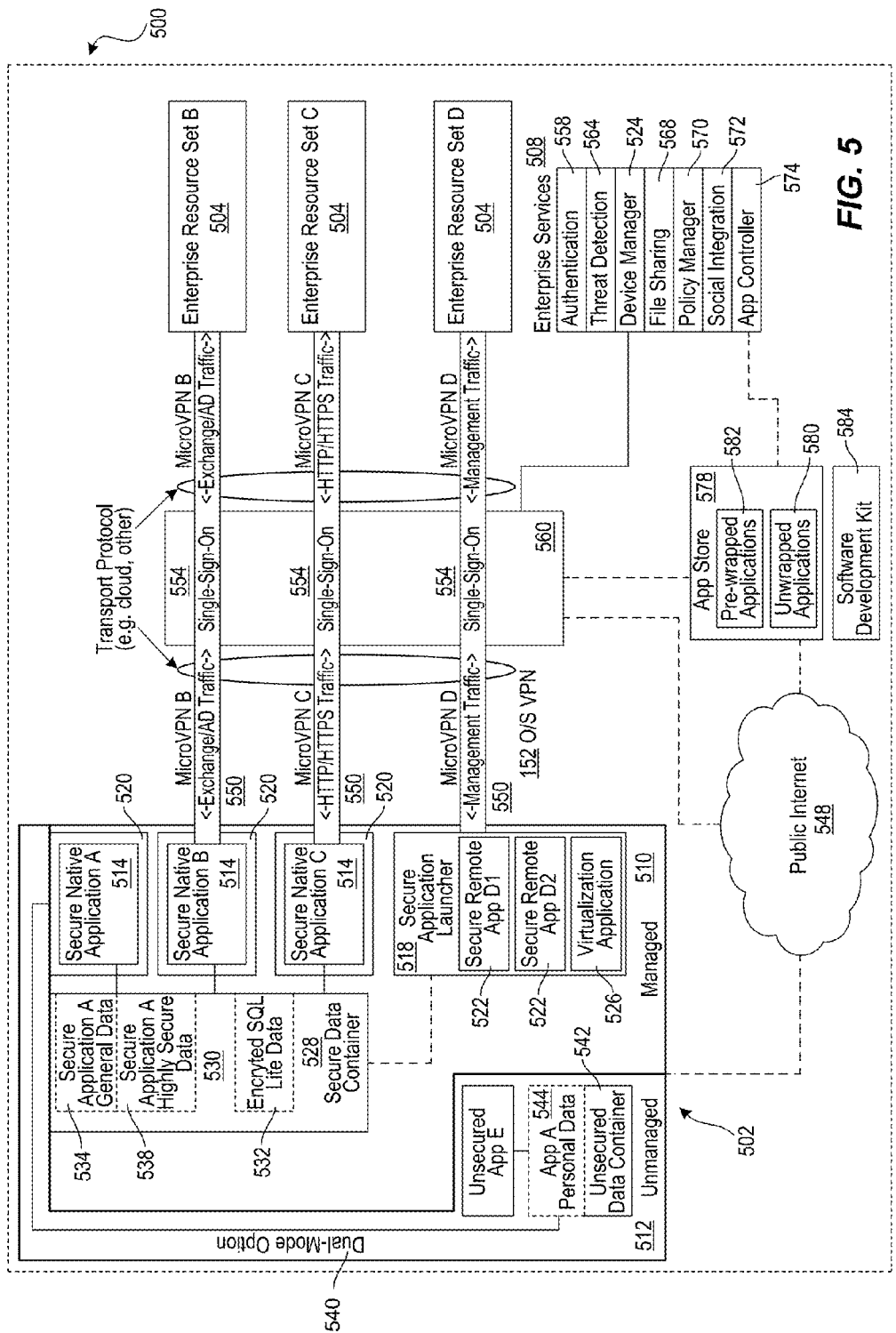
FIG. 5 shows an illustrative enterprise mobility technical architecture that may be used in accordance with one or more illustrative aspects described herein.

FIG. 5 represents an enterprise mobility technical architecture 500 for use in a bring-your-own-device (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as AES 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
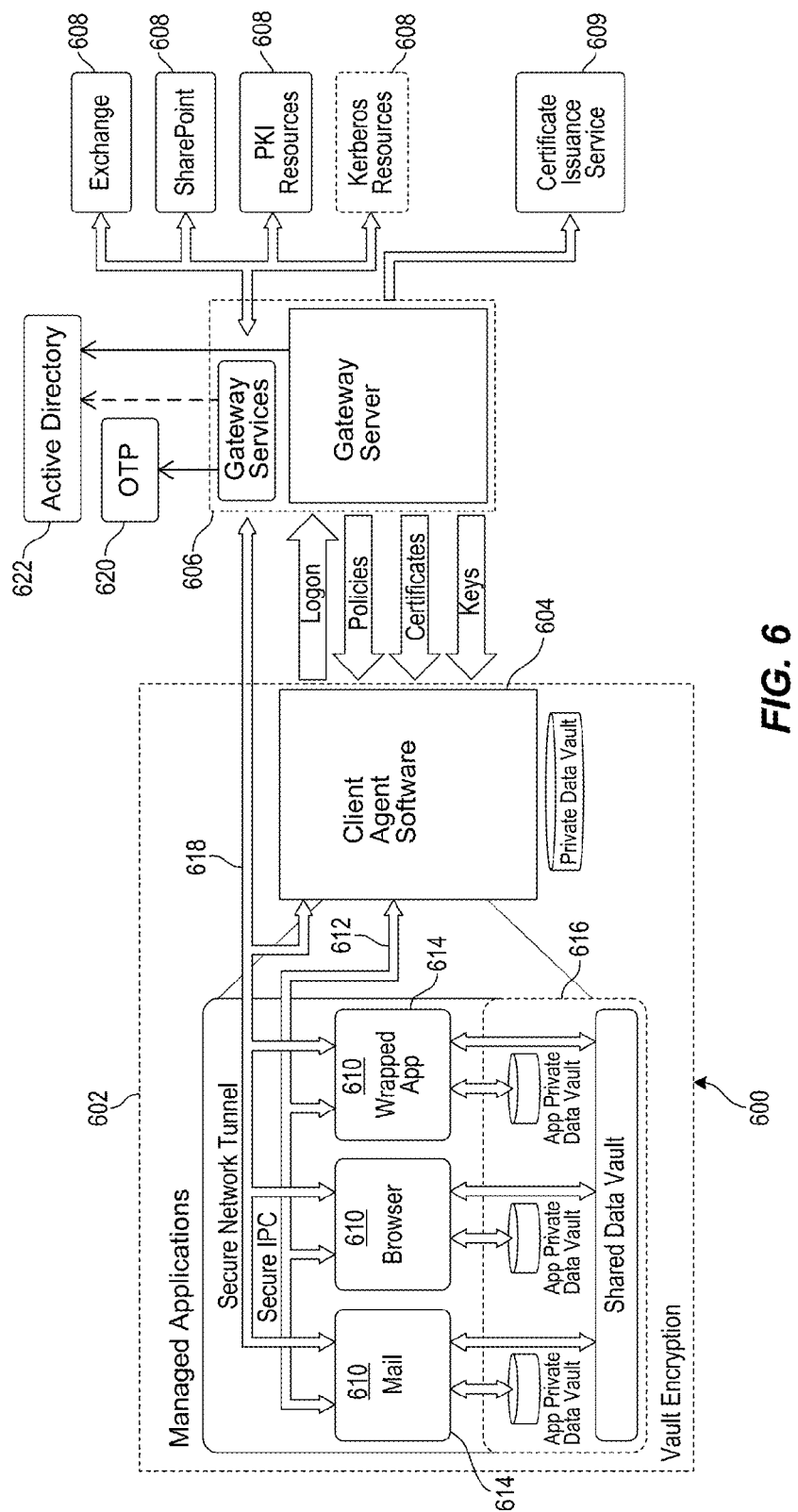
FIG. 6 shows yet another illustrative enterprise mobility technical architecture that may be used in accordance with one or more illustrative aspects described herein

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, PKI Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the HDX/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The Secure IPC links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

[94] Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a PKCS 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in AFEE, where AFEE supports invoking Kerberos protocol transition so it can obtain and use Kerberos service tickets (subject to constrained delegation) in response to HTTP Negotiate authentication challenges. This mechanism works in reverse web proxy (aka CVPN) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of enterprise application store and an application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Ubiquitous Collaboration in Managed Applications.

While chat applications already exist, they are often standalone applications that require users to start them and then frequently change context to perform chat activities. This disclosure describes ubiquitous collaboration that occurs through managed applications communicating via a client agent and one or more policies, such that instead of performing collaboration using a separate application, various collaboration features may be built directly or injected into a managed application. At least one advantage of various examples of the aforementioned system is that a user does not need to change context by manually starting or switching to another application that provides collaboration functionality. Rather, an application that previously might not have had collaboration functionality may now automatically include various collaboration features when it becomes managed.

Figure 8:
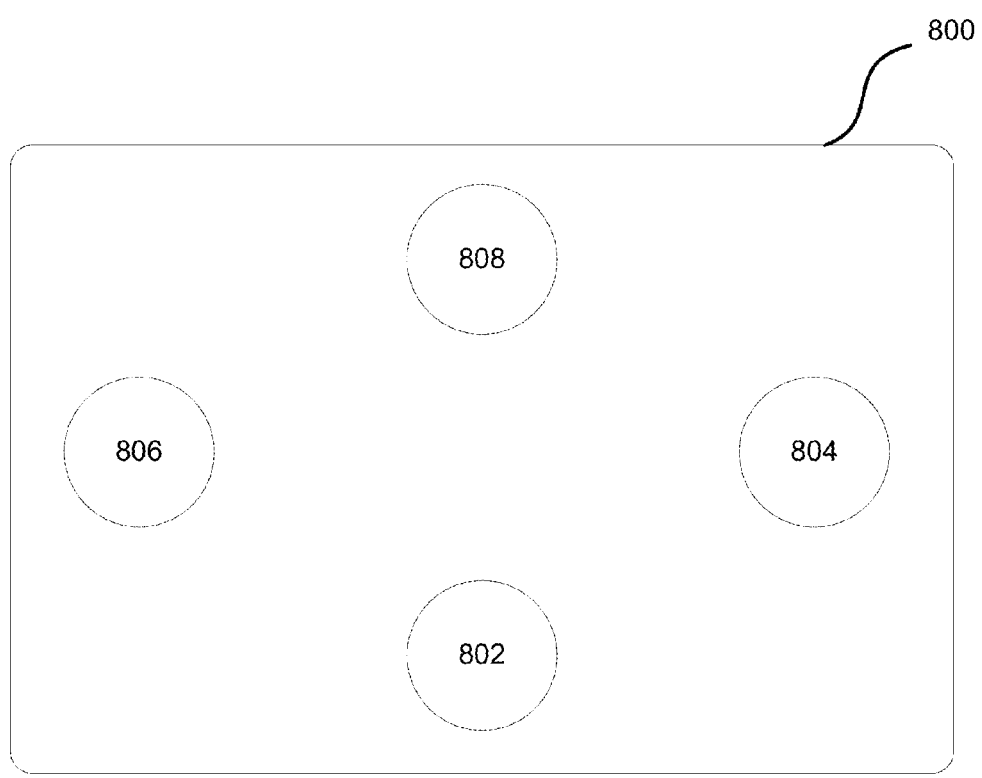
FIG. 8 shows an illustrative client-side graphical user interface (GUI) for displaying various collaboration features/types to a user for selection in accordance with, but not limited to, one or more illustrative aspects described herein.

Examples of collaboration features include, but are not limited to, a text chat feature, a video chat feature (e.g., through a web camera and microphone), an audio chat feature (e.g., over VoIP), a presence feature, a combination of the aforementioned, and/or other features. For example, a collaboration feature in a managed application may include a text chat feature as well as a presence feature. In another example, a managed application may display a menu similar to the graphical user interface 800 (GUI) of FIG. 8 to allow a user to select among a plurality of collaboration options, such as text chat 802, audio chat 804, video chat 806, and presence 808.

Figure 13:
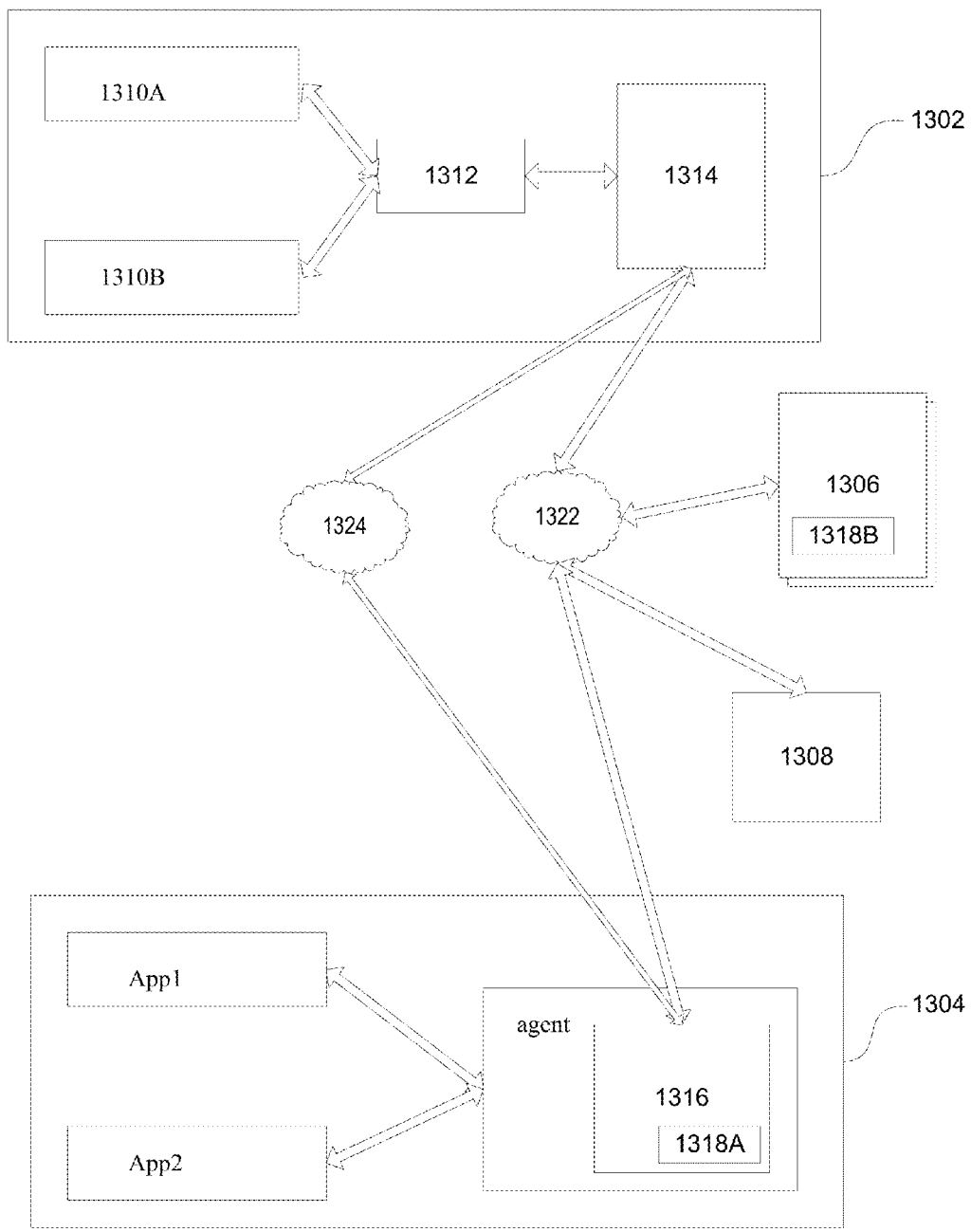
FIG. 13 depicts an illustrative component architecture involving a collaboration service in accordance with one or more illustrative aspects described herein.

Referring to FIG. 13, in one example, a client computing device 1302 may execute a managed application 1310A. The managed application 1310A may be managed by a client agent 1312 (e.g., a CITRIX MDX agent) in communication, either directly or indirectly, with one or more services 1314 and/or server machines 1306. For example, computer-executable instructions (e.g., software, firmware, or other logic programming) may be stored in one or more memories (e.g., non-transitory computer-readable media) in the various devices illustrated in the system of FIG. 5. The computer-executable instructions may assist a client computing device 1302, 1304 to access policy information to determine whether or not to render one or more collaboration features in combination with the rendering (e.g., displaying) of the managed application. In one example, the policy information may cause the client agent 1312 to determine whether or not the managed application 1310A is executing in a secure (e.g., corporate network) or unsecured context and manage the collaboration feature accordingly based on the policies—e.g., the collaboration feature may be rendered in a managed environment when in a secure context, but not in an unsecure context. In another example, an enrolled device (e.g., client computing device 1302) may include a client agent 604 that interacts with a gateway server 606 (which may include an access gateway and application controller functionality) to access various enterprise resources 608 and services 609, as illustrated in FIG. 6. An example of a service may be a collaboration service 1314. Likewise, an example of a resource may be a collaboration server 1306. The client agent 1312 and application management framework, as illustrated in FIG. 5, may provide policy-driven management capabilities and features to enterprise resources/services. The client agent 1312 may serve, in one example, as an UI (user interface) intermediary for Windows apps/desktops hosted in an enterprise data center. The client agent 1312 may also support the installation and management of native applications on the client computing device 1302. The client agent 1312 may obtain policies from a server (e.g., gateway server 606) to control the behavior of the managed applications 1310A on the client computing device 1302. Furthermore, the application management framework 614 may request policy information from the client agent 604, which in turn may request it from a gateway server 606. In some examples, the application management framework 614 may "wrap" a managed application 1310A. As such, the application management framework 614 may enforce relevant portions of one or more policies that apply locally, such as the client agent login dependencies and some containment policies that may restrict how local operating system (OS) services may be used, or how they may interact with the application 1310A.

Similarly, one or more features of a collaboration feature might not be rendered based on policy information. For example, if the client computing device 1302 is determined to be located in a highly secure (e.g., top-secret office building) location, the camera functionality of the collaboration feature may be deactivated to prevent unauthorized transmissions of images. Alternatively, the video and/or audio features of the collaboration feature may be activated or deactivated based on one or more factors (e.g., contexts) in the policy information accessed by the client agent 1312. One or more policies may be created and stored to assist in implementing the aforementioned capabilities (e.g., turning ON and OFF aspects of the collaboration feature).

In one example involving the system of FIG. 13, the client agent 1312 may coordinate with a local collaboration service 1314 and/or a remote collaboration server 1306 via a network (e.g., wide area network 1322). The collaboration service 1314 may use one or more of existing services (e.g., authentication services 558, threat detection services 564, device manager services 524, file sharing services 568, policy manager services 570, social integration services 572, application controller services 574, user authentication services, device authentication services, application authentication services, data authentication services, configuration services, provisioning services, security services, support services, monitoring services, reporting services, decommissioning services, combinations thereof, and/or the like) to provide managed applications rendered on the client computing device 1302 with one or more collaboration features.

Through coordination with a client agent 1312, managed applications 1310A, 1310B may provide collaboration features even though native version of the managed applications (e.g., the actual source code for the application corresponding to the managed application) did not originally include source code for collaboration features. The application may be wrapped to transform the application into a managed application that is capable of providing, inter alia, collaboration features. The client agent 1312 may enable the collaboration features to be displayed in combination with other managed features of the managed application, thus providing the user with a shared, single context within which the user may interact with the managed application while also interacting with the collaboration features. For example, when the user minimizes the managed application, the collaboration features may also be automatically minimized. Furthermore, in some examples, the managed application and/or the client agent may include one or more configuration files (e.g., one or more data blocks or blobs storing configuration information). The configuration file may include style, font, and other information to direct the rendering of the collaboration features in combination with the managed application.

In some examples, the collaboration feature may incorporate a ubiquitous characteristic such that the user's experience with the collaboration features across different managed applications 1310A, 1310B executing on the same client computing device 1302 may be essentially seamless. In one example, the client agent 1312 may receive session information maintained, for example, in memory at the collaboration service 1314. The client agent 1312 may initially receive the session information from the collaboration service 1314 at initialization of the collaboration service at the client computing device. The collaboration service 1314 may have received the session information 1318B from a collaboration server 1306.

The session information may include a configuration file (e.g., one or more data blocks or blobs storing configuration information) comprising one or more of color information, style information, font information, formatting information, and/or other information. In addition, the session information may include a list comprising one or more collaborators that may appear on the user's contact list and/or that may be online at the moment. The session information may also include historical records and/or logs of the user's prior collaboration sessions, including, for example, a history of recent conversations with one or more collaborators. The session information may also include unique identifying information corresponding to the particular user of the client computing device 1302.

Figure 14:
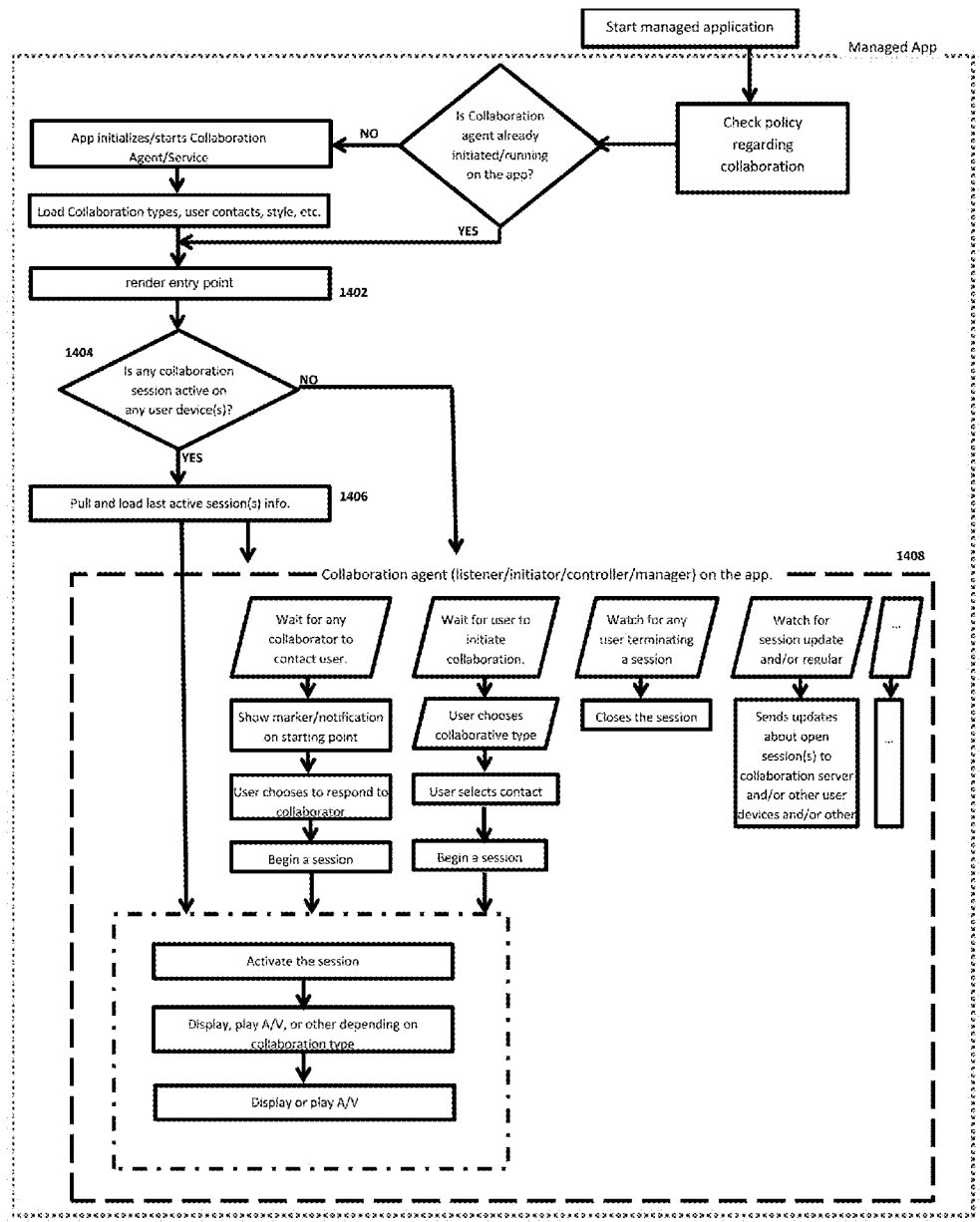
FIG. 14 is a flowchart illustrating steps that may be performed by one or more agents/services in accordance with one or more illustrative aspects described herein.

Referring to FIG. 14, different managed applications 1310A, 1310B executing on the same client computing device 1302 may each render an entry point (step 1402) of a collaboration feature. The collaboration feature 1408 of a managed application may listen/initiate/control/manage based on the input. For example, the collaboration feature 1408 may be waiting for another collaborator to contact the user, or wait for the user to initiate a call over IP with someone else, or other features. The managed application environment ensures the same session information to assure a seamless, integrated collaboration experience. The client agent 1312 may be responsible for coordinating updating of the session information 1318B while the collaboration features are active in either managed applications 1310A, 1310B. For example, the client agent 1312 may check (in step 1404) if any collaboration session is active on the client computing device 1302. If there is, the client agent 1312 may coordinate retrieving and loading the last active session information in step 1406. As such, the latest session information may be used to active the session at the collaboration feature 1408. Even when no managed application is actively using the collaboration features, the client agent 1312 may facilitate maintenance of session information as a background process via collaboration service 1314. As a result, in the event that the client agent 1312 receives notification of the launch of a new managed application 1310B, the prior state of the collaboration features may be restored and displayed via the maintained session information. In other words, the client agent 1312 is able to provide for a roaming of collaboration features among managed applications 1310A, 1310B through use of single, persistent session information.

Figure 10:
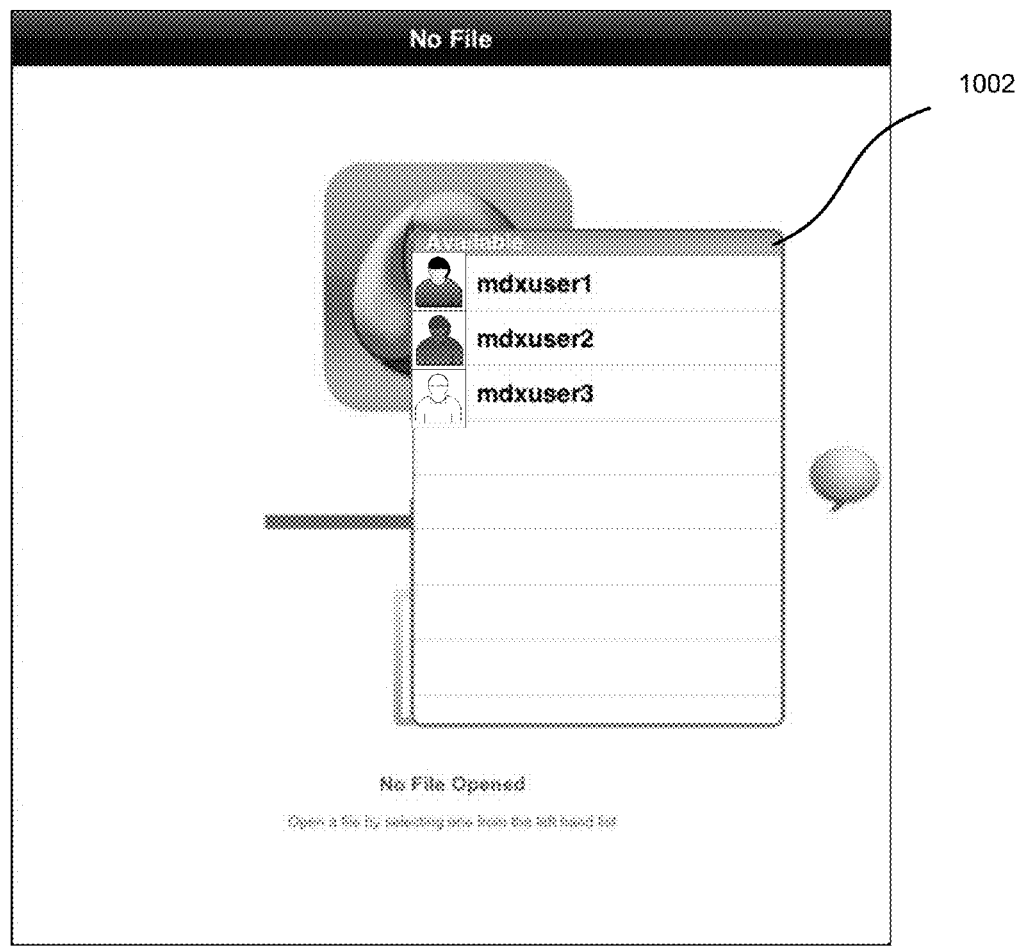

Furthermore, the functionality of the collaboration feature may use one or more session information. For example, referring to FIG. 10, the client agent may use the session information 1318B to determine a list of collaborators to render on a display of client computing device 1302. The client agent 1312 may also indicate whether one or more of the collaborators displayed 1002 are presently online (i.e., the presence feature in collaboration). The client agent 1312 may communicate, either directly as in device 1304 or indirectly as in device 1302, with a collaboration server 1306 to determine whether or not particular collaborators are online. The collaboration server 1306 may maintain such information, inter alia, in memory at the server 1306. Similarly, the client agent 1312 may use session information (e.g., a configuration file) to render the collaboration features in combination with the managed application 1310A.

Although some of the examples provided herein refer to a client agent 1312 and a collaboration service 1314, in some examples, such as with client computing device 1304, the client agent and collaboration service 1316 may be conflated into a single functional module. In other words, the aforementioned client agent architecture may be extended to directly integrate the functionality of a collaboration service. Along the same lines, the illustrative system of FIG. 13 depicts collaboration services 1314, 1316 communicating with each other via a central collaboration server 1306; nevertheless, in some examples, the collaboration services 1314, 1316 may be configured to communicate directly with each other via, for example, a network (e.g., local area network 1324). In such an example, some of the functionality provide by the collaboration server 1306 may be conflated into one or more of the collaboration services 1314, 1316.

In addition, administration of the system may be performed, in one example, via an administrative console 1308. The administrative console 1308 may be a server machine (e.g. a web server) that provides a user interface through which a user (e.g., an administrator, a programmer of a native application corresponding to a managed application, an end user, etc.) may configure the collaboration service/ server for a more seamless integration with managed applications. In addition, an administration console 508 in communication with one or more client computing devices 1302, 1304 may be used to push commands, such as a remote wipe command, to a device. Likewise, the administration console 508 may be used by a user to update policies and/or other information (e.g., configuration files) stored at a resource server 1306 or services 1314.

Furthermore, the administrative console 1308 may be allow, inter alia, creating and/or updating of configuration information/policy files that may be used to designate how/ when collaboration features are rendered in combination with particular managed applications and contexts. For example, a programmer/author of a first managed application 1310A may designate particular colors, styles, font, etc. to be used in rendering collaboration features in combination with the first managed application 1310A. As such, without actually having programmed a native collaboration feature in the application corresponding to the managed application 1310A, the programmer/author/designee/user can provide stylistic information for rendering of collaboration features. Likewise, the author/programmer/designee/user of another managed application 1310B may provide their own configuration information/file for rendering of collaboration features with their managed application 1310B. The configuration file may provide universal style information for all users of the managed application 1310B, or may provide rules and/or policies designating which information applies to which renderings.

Moreover, for those programmers/authors of an application corresponding to a managed application 1310A that wish to further integrate and/or take advantage of the collaboration features provided through the client agent 1312, an application programmer's interface (API) (or software development kit (SDK)) may be made available to interface with the client agent 1312 and/or collaboration service 1314. In some examples, before automatically rendering a collaboration feature/application in combination with the rendering of a managed application 1310A, the client agent 1312 may provide, through an interface with the managed application, the managed application 1310A an opportunity to control/interact with the collaboration feature (e.g., modify how/when/where the collaboration feature is rendered). For example, the managed application may be provided with notification of a new incoming text chat message. Through the provided API/SDK, the managed application 1310A may block the display of new text chat message based on particular rules/policies (e.g., if the managed application 1310A is a sales presentation application and the application is in formal presentation mode, then the managed application may interface with the collaboration service 1314/client agent 1312 to temporarily block display of new incoming chat messages.) Similarly, other hooks may be created into the collaboration features such that managed applications 1310A, 1310B may use policies/rules to have more control over the rendering/use of collaboration features. In addition, the hooks may allow the managed application 1310A, 1310B to modify its behavior based on activity in the collaboration features (e.g., the managed application may display appropriate information or generate an audible alert when it detects the presence of particular collaborators online.) For example, if a user of client computing device 1302 is editing a spreadsheet using a managed spreadsheet application and one of the co-authors of the spreadsheet (e.g., based on prior revisions in the spreadsheet's history log) appears online, the managed application may hook into the collaboration feature to automatically generate a special alert to notify the user of the other's presence. Other rules/policies are contemplated herein for use in hooking the managed application into the collaboration features.

Figure 9:
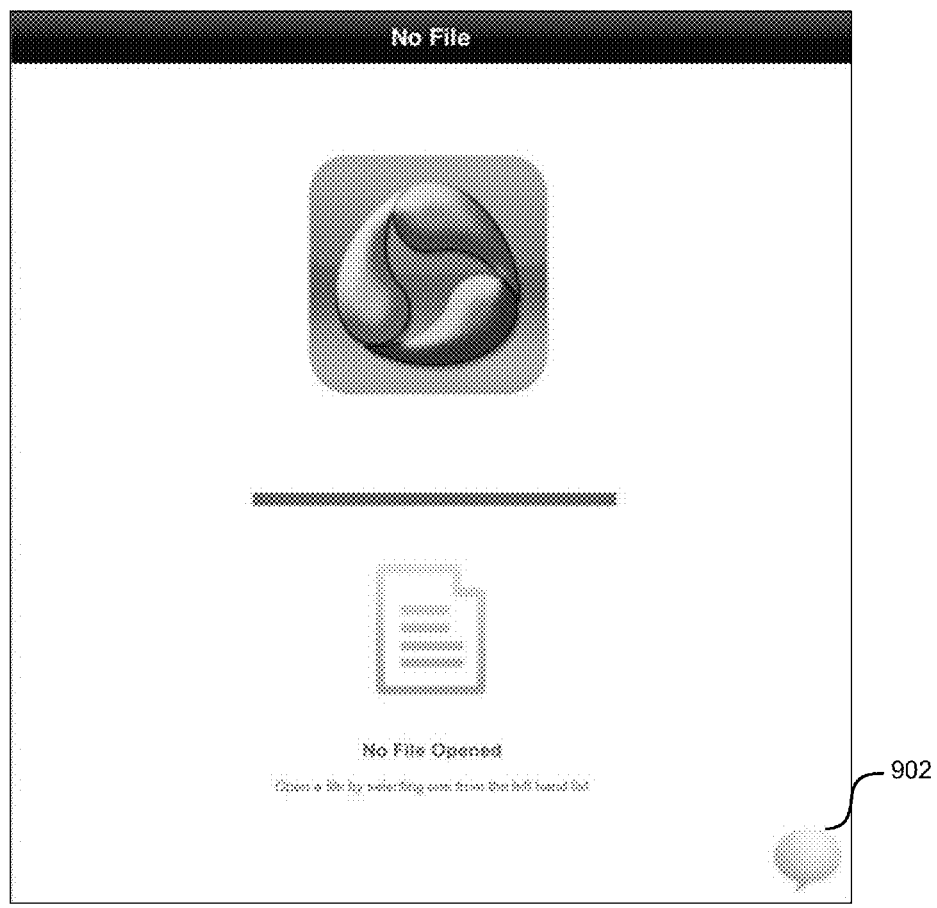
FIG. 9, FIG. 10, FIG. 11, and FIG. 12 are illustrative graphical user interfaces showing a managed application rendered in combination with a collaboration feature provided through a collaboration service in accordance with one or more illustrative aspects described herein.

In one example involving FIG. 13, a client agent 1312 executing on a client computing device 1302 may receive notification of a launch of a first managed application 1310A on the client computing device 1302. In one example, the client agent 1312 may determine that the context for the managed application may comprise a location for the client computing device 1302 that will be running the managed application, a determination as to whether a predetermined application is running on the client computing device 1302, one or more network connections for the client computing device 1302, and one or more settings for the client computing device 1302. One or more of these contexts may be compared to policies (e.g., stored policies accessible to the client agent 1312) to determine a mode (e.g., managed or unmanaged) for the managed application. Depending on the mode and/or context, the client agent 1312 may (or may not) automatically render on the client computing device 1302 a collaboration feature in combination with a rendering of the first managed application 1310A. In one example, the rendering may result in graphic 902 (see FIG. 9) being displayed on the screen of the client computing device 1302, where previously such an icon would not have been rendered by just the first managed application 1310A. In addition, the client agent 1312 may receive session information for the collaboration feature. The session information may assist the client agent 1312 in rendering a dialog box with a list of collaborators (see, e.g., FIG. 10) or for displaying a history of recent conversations with another collaborator (see, e.g., FIG. 11). Meanwhile, the client agent 1312 may also send update information to the collaboration service 1314 to update the session information. For example, as the user interacts with the collaboration feature, the updated information may be sent to the collaboration service 1314 so that the updates may be propagated to other collaboration features.

Even when the first managed application 1310A is closed/terminated, the session information and collaboration service may persist as a background process in the computer memory of the client computing device 1302. As such, when the client agent 1312 receives notification of a launch of a second managed application 1310B on the client computing device 1302, the client agent 1312 and/or collaboration service 1314 may access the stored session information and render the collaboration features/application in combination with the rendering of the second managed application 1310B. In other words, assuming the online collaborators have not changed status, the contact list 1002 rendered in combination with the second managed application 1310B may be similar to that which was rendered in combination with the first managed application 1310A. Likewise, if the user opens a text chat dialog box with the same collaborator as the user previously conversed with while in the context of the first managed application 1310A, even though the user is in the context of the second managed application 1310B, the dialog box 1102 may show the prior, saved context. As such, the collaboration feature/application may appear to be ubiquitous across a plurality of managed applications.

With respect to an unmanaged application, the client computing device 1302 may launch the native application in an unmanaged manner. In other words, the client agent 1312 facilitates rendering of the application in an unmanaged mode such that some or all of the collaboration feature is not rendered/available. Alternatively, the client agent 1312 might not be present during unmanaged mode and the native application may launch only those features that were actually previously coded into the application. In some instance an application may run in partially managed mode. Then, the application may be run similar to an application running in managed mode, but might not include all aspects of the latter. Depending on the determined context, an application running in partially managed mode may include aspects of an application running in managed mode and aspects of an application running in unmanaged mode.

In the unmanaged mode, an application 1310A might not have the aforementioned collaboration features provided to it via the collaboration service 1314 or collaboration server 1306. Along that same line, if a managed application 1310A, 1310B were to lose, for example, network connectivity such that the mode changes from managed to unmanaged (or vice-a-versa), then the client agent may not render collaboration features. For example, the collaboration features may be displayed as greyed out and/or indicated as temporarily unavailable. In another example, the icon 902 may temporarily disappear from the user's screen. In yet another example, when the network connectivity context changes (i.e. from connected to unconnected), those features, such as collaboration, that depend upon network connectivity, may be temporarily unavailable and indicated as such. Finally, in yet another example, a location of a client computing device, such as mobile device 502, may be determined. The location may be determined by GPS, signal triangulation, or any other suitable or otherwise known manner. The location may comprise a context for the managed application 1310A. The determined location may be compared with a location policy. For example, a policy may define that a managed application 1310A may run in managed mode when in a certain location, for example, on company premises. Accordingly, the client agent may render collaboration features in combination with the managed application 1310A.

In some examples, a managed application may switch from a managed application to an unmanaged application while the application is running. One or more contexts may be monitored for the managed application while running and a change in context may be detected based on the monitoring. For example, one or more contexts may change for the managed application and a policy may define that an mode for the managed application is to be changed. When a change in a mode of a managed application is detected (e.g., there is a change in context information that previously formed the basis for selecting between managed and unmanaged mode) based on the monitoring, the mode of the managed application is switched to the updated mode.

Although the previous examples involve situations where the client agent 1312 deactivates one or more collaboration features, in other examples the client agent's 1312 act of deactivating may be discretionary based on one or more policies/inputs/conditions. For example, one or more policies/rules may be implemented by the managing application 1310A and/or client agent 1312 to obtain a desired outcome. For example, location-based policies might be invoked to prevent automatic pop-up of collaboration features during particular times (e.g., while driving a vehicle). A GPS device in the vehicle may be used to detect driving behavior and block collaboration features during such acts. Likewise, activity-based policies, device-based policies, policies based on whether or not the device 1302 has network connectivity, combinations of the one or more of the preceding, and other policies/rules. Such policies may switch the collaboration feature between OFF to ON, and ON to OFF, as appropriate.

In one example involving a location-based policy/rule, a client agent 1312 may receive notification of a launch of a managed application 1310A. The collaboration server 1306 may maintain stored rules in its memory 1318B relating to one or more collaboration features associated with the managed application 1310A. As such, the client agent may access, through a collaboration service 1314, the one or more stored rules associated with the managed application 1310A to determine whether the rules/policies are satisfied. The rule/policy may comprise one or more factors, such as context based on location, activity level/type, device characteristics, network connectivity, a combination of the aforementioned factors, or other factors. Assuming the client agent 1312, through the collaboration service 1314, detects that one or more stored rules are not satisfied because, for example, a value of one of the factors has negatively changed, then the client agent 1312 may block the collaboration feature from being rendered in combination with the managed application 1310A. As such, the rule/policy may dictate whether a collaboration feature is permitted or not. Meanwhile, a different managed application 1310B with a different set of stored rules/policies may launch with the client agent 1312 rendering collaboration features. Meanwhile, the collaboration server 1306 may store default rules/policies that may apply to those managed applications that do not have defined rules/policies.

In some examples, a managed application may be switched to an unmanaged application while a managed application is running. One or more contexts may be monitored for the managed application while running and a switch in mode may be caused based on the monitoring. For example, one or more contexts may change for the managed application and a policy may define that a mode for the managed application is to be changed. When a change in a mode of a managed application is detected (e.g., there is a change in information/context that formed the basis for selecting a particular mode) based on the monitoring, the mode for the managed application is switched to the updated mode.

Figure 7A:
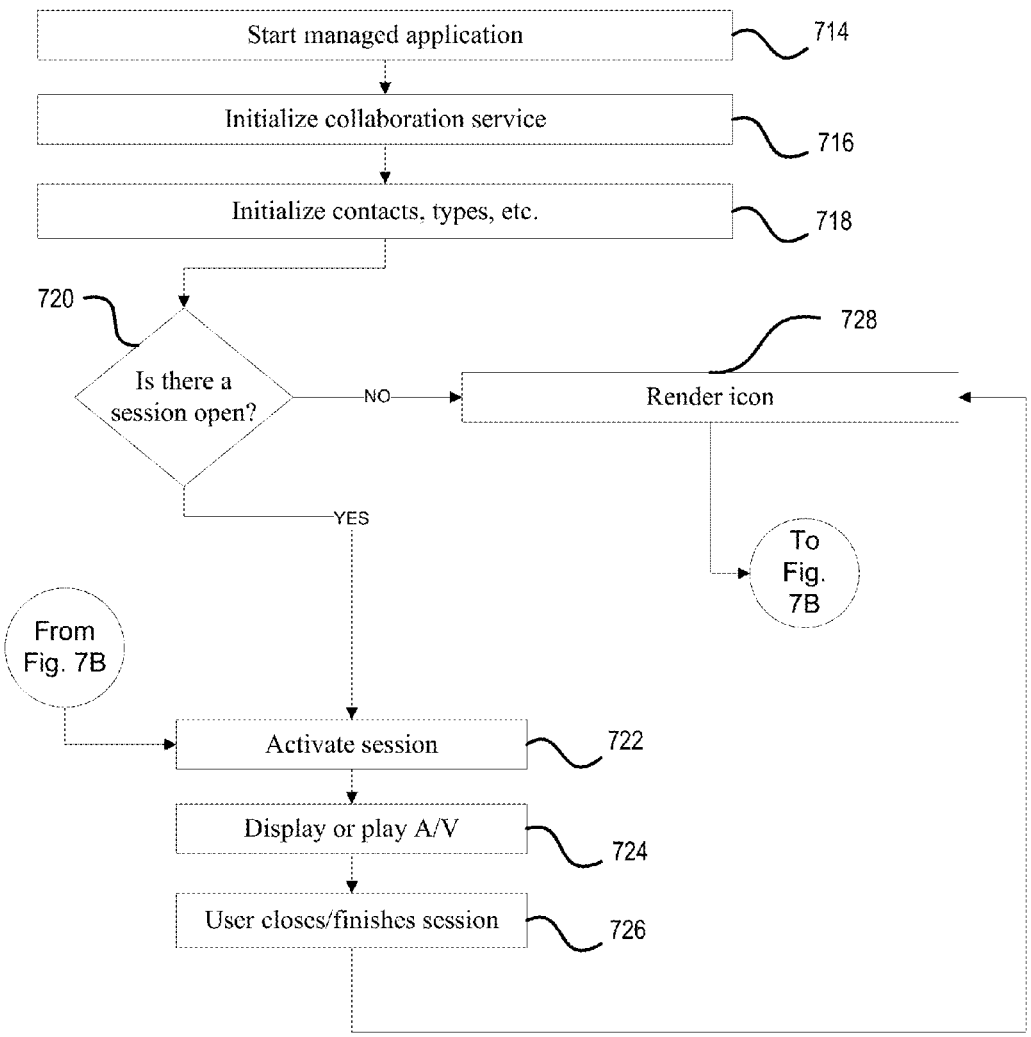
FIG. 7A and FIG. 7B are flowcharts of illustrative steps that may be performed by one or more agents/services executing on a client computing device in accordance with one or more illustrative aspects described herein.
Figure 7B:
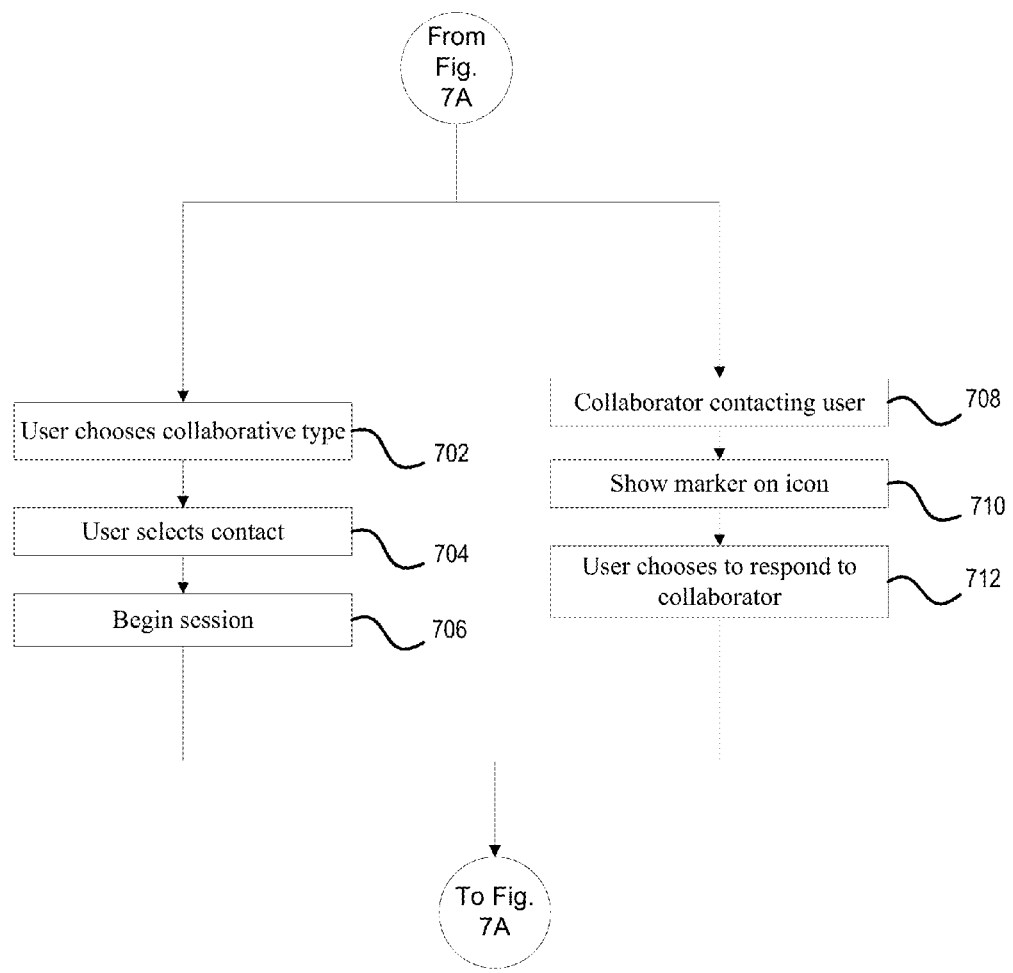
Figure 11:
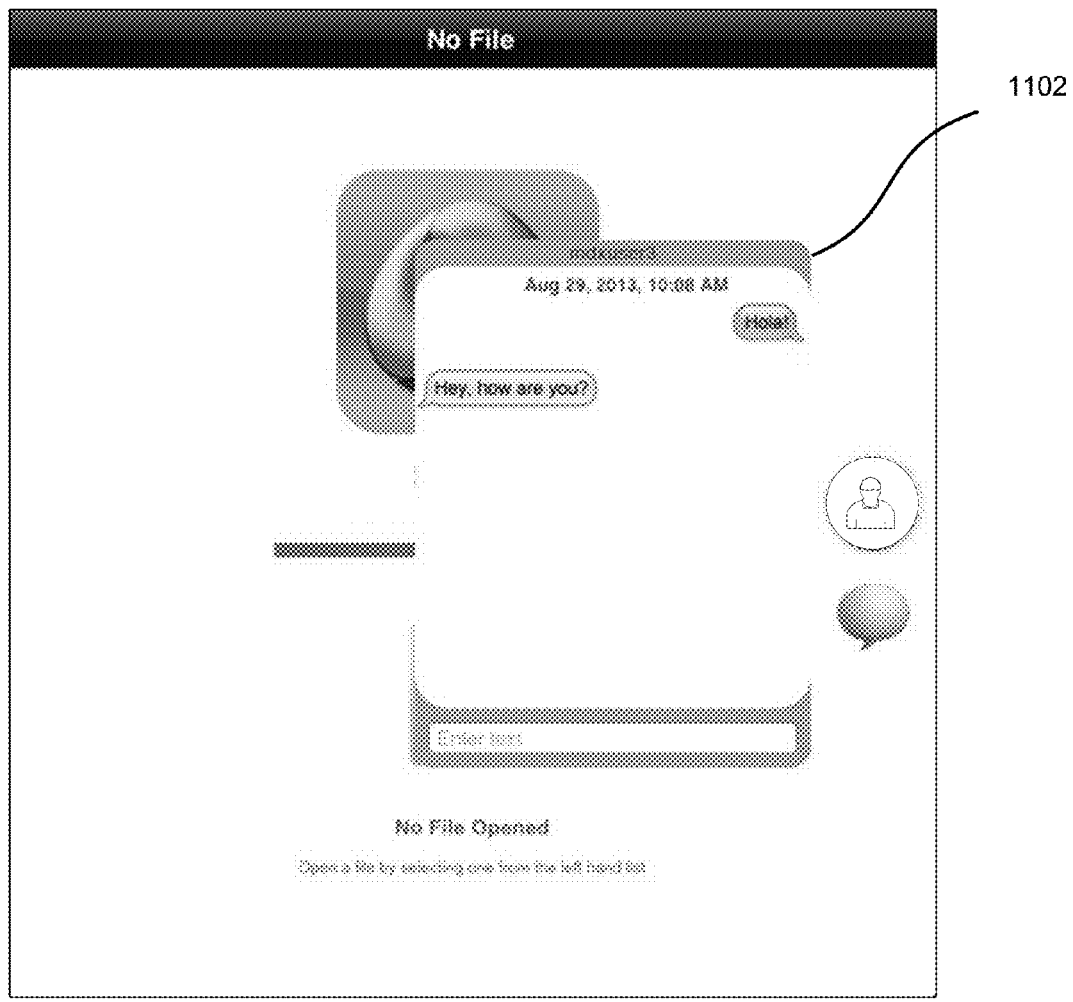

Referring to FIG. 7A and FIG. 7B, flowcharts are illustrated of steps performed by one or more agents/services executing on a client computing device 1302, 1304 in accordance with one or more illustrative aspects described herein. An application (e.g., managed application 1310A) may be launched (step 714) on a client computing device 1302. The client agent may initialize (step 716) a collaboration service 1314, if one is not already executing as a background process thread. The collaboration service 1314 may communicate with a collaboration server 1306 to determine (step 718) session information, such as, but not limited to, contacts list, contact types, and other information. The session information may be downloaded to the client computing device 1302 to start a session if (step 720) a session is not already active. If a session is not already active, the client agent 1312 may render/show (step 728) an icon 902 overlaid upon the managed application 1310A being launched. If the user activates (step 722) a session for video, text, or audio chat, then client agent through the collaboration service may render the appropriate content—e.g., may display (step 724) a dialog box 1102 with text chat, as illustrated in FIG. 11. In the example of a video chat or audio chat, a media player may be activated and the appropriate multimedia may be outputted to the user. When the user closes (step 726) the text chat dialog box 1102, the session information and collaboration service 1314 may remain as a background process on the client computing device 1302.

Figure 12:
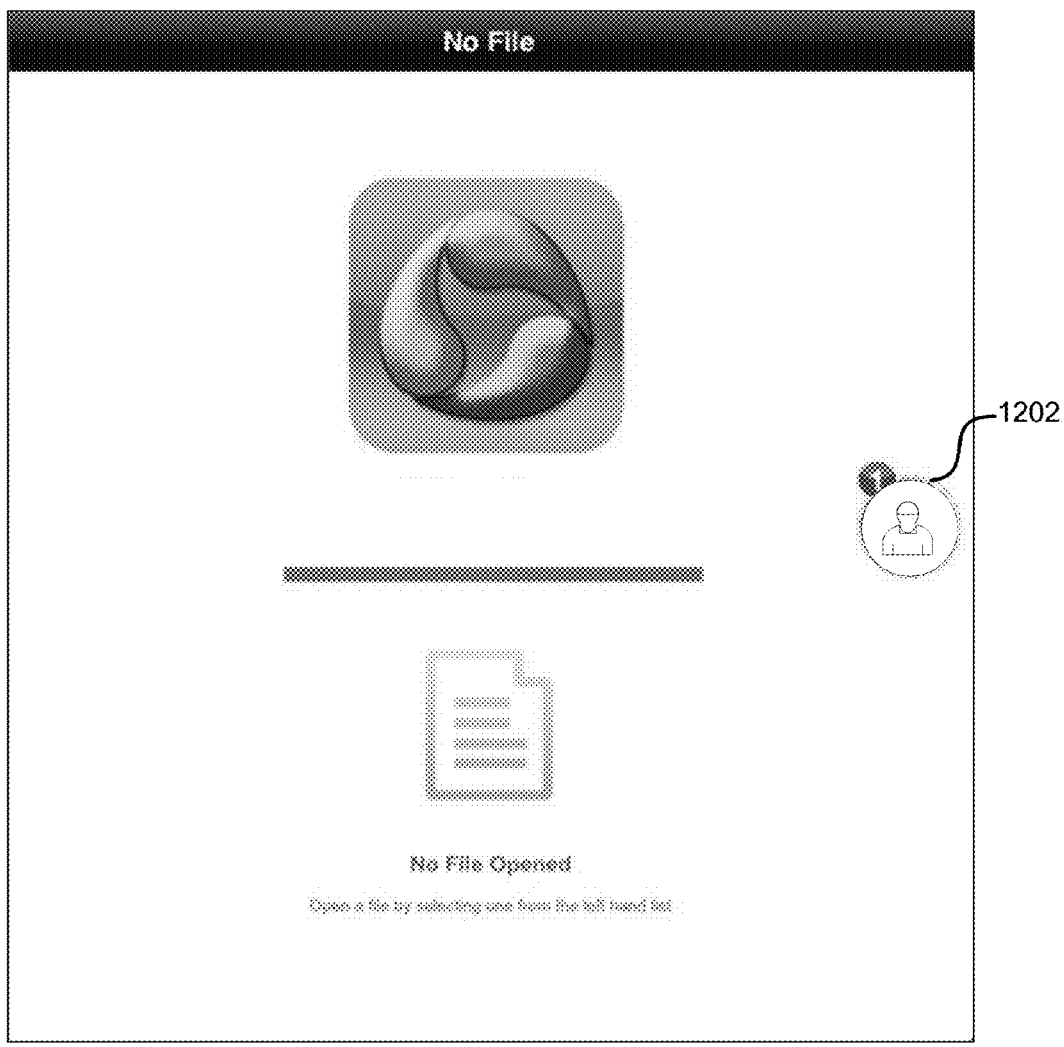

As a result of waiting in the background process, should someone contact (step 708) the user of the client computing device 1302 via a collaboration feature, a notification 1202 may be rendered on the user's display, such as in FIG. 12. A marker may be shown (step 710) on the icon 1202 to indicate that one new message is awaiting the user's review. The user may choose to open the message and respond (step 712) to the message, or simply ignore the message. Furthermore, in some examples, the user may choose (step 702) from among a plurality of collaboration features/types, such as those illustrated in FIG. 8. Then the user may select (step 704) the contact/collaborator with whom the user wishes to correspond, such as in FIG. 10. Consequently, a session may begin (step 706) between the user and the selected collaborator. Meanwhile, if the user exits the managed application and launches another managed application, the collaboration session may persist. The managed applications need not, and frequently will not, be aware of each other. Rather, through the client agent 1312 and collaboration service 1314/collaboration server 1306, the system provides a seamless, persistent collaboration feature across different managed applications.

In one example, a context may comprise a managed application configured to access a secure account, such as a banking application configured to access a bank account. This context may be compared to a stored policy. For instance, the stored policy may define that a banking application that is configured to access a bank account is to be run as a managed application with collaboration features, such as video chat or text chat. Additional contexts and policies may also be included. Subsequently, the managed application 1310A may be run in the determined mode and the appropriate collaboration features may be rendered in combination with the managed application 1310A. The managed application 1310A may be run as a native application 514, remote application 522 executed by a application launcher 518, virtualization application 526 executed by a application launcher 518, and the like. In another example, an application running in managed mode may access parts of a portal that might not be accessible by unmanaged applications.

While numerous of the aforementioned examples have involved managed applications have not mentioned virtualized application, in some examples, the managed applications may be a virtualized application that use a remote presentation protocol to communicate with a virtualization server. As such the application 1310A may be rendered at a client computing device 1302 on a user display, while executing at the virtualization server. In such examples, a client agent 1312 may communicate with a virtualization server and automatically coordinate, by the client agent, rendering of a collaboration feature in combination with a rendering of the application 1310A. The client agent 1312 may facilitate communication of session information with the managed application 1310A with collaboration feature. Furthermore, when a second application (e.g., a second virtualized application 1310B rendered using a remote presentation protocol) is launched on the client computing device 1302, the client agent may receive notification. The client agent may render the collaboration feature in combination with the rendering of the second application 1310B and send session information to the collaboration feature 1310B. Meanwhile, a collaboration service may execute at the virtualization server (or other server remote to the client computing device 1302) to synchronize and/or coordinate the rendering of the collaboration feature in each of the applications 1310A, 1310B. As a result, the user's experience with the collaboration feature is more seamless because although the applications 1310A, 1310B themselves may be different, the collaboration feature being used in them is the same. In other words, the arrangement allows for the collaboration feature to execute in a single context across the first application 1310A and second application 1310B. Similar to the examples involving managed application, the collaboration feature may include text chat, video chat, presence, and other features described herein. Moreover, the system may provide one or more configuration files (e.g., a configuration blob) including information about how (e.g., aesthetically) the collaboration feature is to be rendered, as described herein.

In one example, a client computing device 1302 may execute a managed application 1310A. The managed application 1310A may be managed by a client agent 1312 in communication, either directly or indirectly, with one or more services 1314 and/or server machines 1306. For example, computer-executable instructions (e.g., software, firmware, or other logic programming) may be stored in one or more memories (e.g., non-transitory computer-readable media) in the various devices illustrated in the system of FIG. 5. The computer-executable instructions may assist a client computing device 1302, 1304 to connect, using a remote presentation protocol (e.g., independent computing architecture (ICA) protocol or other protocols), to an instantiated application in a virtualized environment hosted at a virtualization server. For example, a managed application may be executing on a virtualization server and rendered via a remote presentation protocol (e.g., independent computing architecture (ICA) protocol) on the client computing device 1302. The ICA protocol has been used in products such as, but not limited to CITRIX XenApp and XenDesktop to separate application logic (which may run on a remote system, sometimes in a datacenter) and presentation logic (on a client computing device 1302, 1304). The ICA protocol may send input from the client computing device's input/output components (e.g., keyboard, mouse, audio, etc.) to a remote virtualization system and receives output (e.g., video, sound, etc.) from a remote virtualization system over a network. On the client computing device 1302, 1304, a client agent/module (e.g., CITRIX® RECEIVER™) may be used to handle the remote presentation protocol traffic. In some examples, based on the amount of distribution desired, the application logic and presentation logic may reside on a server and client, respectively; however, in alternate examples, the application logic may span across both the server and client, thus offsetting more of the workload and processing responsibility to the client machine. Although the accompanying figures illustrate a particular distribution of logic between the server and client machines, the disclosure contemplates varying levels of distribution between the various system components.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims. For example, although numerous examples herein refer to configuration files/information and session information, it is to be understood that one or more of these may be conflated into a combined files/policy/information, or alternatively, fragmented or spread across separate files/policies/information. Likewise, although FIG. 13 illustrates client agent 1312 and managed applications 1310A, 1310B beings separate, in some examples a client agent 1312 may be illustrated as being located in managed application 1310A and 1310B. Moreover, managed application 1310A and managed application 1310B may communicate directly with each other (not shown in FIG. 13, but which would be depicted by a dashed line connecting the two blocks in FIG. 13). Furthermore, the functionality described as operating in a particular module or block in FIG. 13 may, when appropriate, be repositioned to occur in a different module and/or block in FIG. 13.

What is claimed is:

1. A method comprising:
   determining, by a client agent executing on a client computing device, a launch of a first managed application on the client computing device, wherein at least one stored policy relating to a collaboration feature is associated with a context of the first managed application;
   accessing, by the client agent, the at least one stored policy relating to the collaboration feature, wherein the at least one stored policy comprises a plurality of contexts that determine whether the at least one stored policy is satisfied;
   detecting, by the client agent, a context of the first managed application;
   comparing, by the client agent, the context of the first managed application with the at least one stored policy to determine whether the at least one stored policy is met; and
   responsive to determining that the at least one stored policy is met:
      activating, by the client agent, the collaboration feature for rendering in combination with a rendering of the first managed application; and
      rendering, at the client computing device, the collaboration feature in combination with a rendering of a first managed application.

2. The method of claim 1, further comprising:
   receiving session information, by the client agent, from a collaboration service associated with the client computing device; and
   using the session information with the first managed application.

3. The method of claim 2, further comprising:
   determining, by the client agent, a launch of a second managed application on the client computing device, wherein the at least one stored policy relating to the collaboration feature is associated with a context of the second managed application;
   detecting, by the client agent, a context of the second managed application;
   comparing, by the client agent, the context of the second managed application with the at least one stored policy to determine that the at least one stored policy is met;
   sending, by the client agent, the session information to the collaboration feature associated with the second managed application;
   permitting, by the client agent, a rendering of the collaboration feature in combination with a rendering of the second managed application;
   rendering, at the client computing device, the collaboration feature in combination with a rendering of a second managed application; and
   updating, by the client agent, the session information of the collaboration feature across the first managed application and the second managed application.

4. The method of claim 3, wherein the activating the collaboration feature for rendering in combination with a rendering of the first managed application comprises:
   deactivating, by the client agent, one or more features of the collaboration feature.

5. The method of claim 3, further comprising:
   intercepting, by the second managed application through an API to interface with the collaboration feature, the rendering of the collaboration feature in combination with the rendering of the second managed application.

6. The method of claim 3, further comprising:
   maintaining, by the client agent, the session information via the collaboration service after execution of the first managed application and execution of the second managed application are terminated.

7. The method of claim 2, wherein the session information comprises a list comprising at least one collaborator, and a history of a recent conversation with the at least one collaborator.

8. The method of claim 2, wherein the using of the session information with the first managed application comprises:
restoring, by the client agent, a prior state of the collaboration feature; and
causing, by the client agent, display of the prior state of the collaboration feature via the first managed application.

9. The method of claim 1, wherein the detecting, by the client agent, of the context of the first managed application comprises detecting a change in location of the client computing device such that the at least one stored policy is met.

10. The method of claim 1, wherein the collaboration feature rendered in combination with the rendering of the first managed application is one of: a text chat application, a video chat application, an audio chat application, and a presence feature.

11. The method of claim 1, wherein prior to the rendering of the collaboration feature in combination with the first managed application, the first managed application is missing the collaboration feature.

12. The method of claim 1, further comprising:
before the rendering of the collaboration feature in combination with the rendering of the first managed application, providing the first managed application with an interface to control the rendering of the collaboration feature.

13. The method of claim 1, further comprising:
responsive to the determining that the at least one stored policy is not met:
prohibiting, by the client agent, a rendering of the collaboration feature in combination with a rendering of the first managed application.

14. The method of claim 1, further comprising:
monitoring, by the client agent, for a change in context in the first managed application; and
comparing, by the client agent, the changed context of the first managed application with the at least one stored policy to determine whether the at least one stored policy is met.

15. The method of claim 1, wherein the at least one store policy is an activity-based policy associated with the client computing device.

16. The method of claim 1,
wherein the first managed application is a virtualized application communicating with a virtualization server using a remote presentation protocol; and
wherein the rendering of the collaboration feature in combination with the rendering of the first managed application further comprises coordinating, by the client agent, with the virtualization server the rendering of the collaboration feature in combination with the rendering of the first managed application.

17. The method of claim 16, wherein the rendering of the collaboration feature in combination with the rendering of the first managed application further comprises:
accessing, by the client agent, a configuration file associated with the first managed application; and
rendering the collaboration feature in accordance with the configuration file.

18. The method of claim 17, wherein the configuration file comprises color and style information, and the rendering the collaboration feature in combination with the rendering of the first managed application comprises rendering a graphical user interface using at least the color and style information.

19. A system comprising:
at least one processor; and
at least one memory for storing computer executable instructions that when executed by the at least one processor cause the system to:
determine a launch of a first managed application, wherein at least one stored policy relating to a collaboration feature is associated with a context of the first managed application;
access the at least one stored policy relating to the collaboration feature, wherein the at least one stored policy comprises a plurality of contexts that determine whether the at least one stored policy is satisfied;
detect a context of the first managed application;
compare the context of the first managed application with the at least one stored policy to determine whether the at least one stored policy is met; and
responsive to determining that the at least one stored policy is met:
activate the collaboration feature for rendering in combination with a rendering of the first managed application; and
permit a rendering the collaboration feature in combination with a rendering of a first managed application.

20. One or more non-transitory computer-readable storage media comprising instructions that when executed by one or more processors cause the one or more processors to:
determine a launch of a first managed application, wherein at least one stored policy relating to a collaboration feature is associated with a context of the first managed application;
access the at least one stored policy relating to the collaboration feature, wherein the at least one stored policy comprises a plurality of contexts that determine whether the at least one stored policy is satisfied;
detect a context of the first managed application;
compare the context of the first managed application with the at least one stored policy to determine whether the at least one stored policy is met; and
responsive to determining that the at least one stored policy is met:
activate the collaboration feature for rendering in combination with a rendering of the first managed application; and
permit a rendering the collaboration feature in combination with a rendering of a first managed application.

* * * * *